(12) United States Patent
Li et al.

(10) Patent No.: US 12,553,226 B2
(45) Date of Patent: Feb. 17, 2026

(54) HANDLE CONNECTING STRUCTURE

(71) Applicant: Beijing Kohler Ltd., Beijing (CN)

(72) Inventors: Huan Li, Beijing (CN); Guang Cheng, Beijing (CN)

(73) Assignee: Beijing Kohler Ltd., Beijing (CN)

( * ) Notice: Subject to any disclaimer, the term of this patent is extended or adjusted under 35 U.S.C. 154(b) by 113 days.

(21) Appl. No.: 18/650,363

(22) Filed: Apr. 30, 2024

(65) Prior Publication Data
US 2024/0384513 A1    Nov. 21, 2024

(30) Foreign Application Priority Data

May 16, 2023  (CN) .......................... 202321171151.4

(51) Int. Cl.
*E03C 1/04* (2006.01)

(52) U.S. Cl.
CPC .................. *E03C 1/0412* (2013.01)

(58) Field of Classification Search
CPC ...... E03C 1/0412; E03C 1/0409; F16K 31/60; F16B 21/16; F16B 21/18
USPC ............. 4/249, 405, 576.1, 577.1, 605, 661, 4/675–678
See application file for complete search history.

(56) References Cited

U.S. PATENT DOCUMENTS

| | | | | |
|---|---|---|---|---|
| 5,826,788 A * | 10/1998 | Redding | ................. | F16K 31/60 137/359 |
| 8,800,962 B2 * | 8/2014 | Ritter | ..................... | F16K 3/0227 285/280 |
| 9,062,796 B2 * | 6/2015 | Horsman | ............... | E03C 1/0412 |
| 2008/0277611 A1 * | 11/2008 | Esche | ................... | F16K 31/602 137/625 |
| 2016/0376780 A1 * | 12/2016 | Yang | ....................... | E03D 5/092 4/249 |

* cited by examiner

*Primary Examiner* — Tuan N Nguyen
(74) *Attorney, Agent, or Firm* — Foley & Lardner LLP (57) ABSTRACT

The present application discloses a handle connecting structure. The handle connecting structure comprises a handle body having a connecting shaft sleeve, a connecting base having a connecting sleeve, and a sliding clamping plate assembled in the connecting sleeve and capable of sliding along a radial direction of the connecting sleeve. The connecting shaft sleeve can be pluggably inserted into the connecting sleeve. A clamping groove can be provided on a circumferential surface of the connecting sleeve. The sliding clamping plate may comprise a clamping main plate with a clamping plate through hole, a guiding protrusion, and an elastic member connected to opposite sides of the clamping main plate. The connecting shaft sleeve can be inserted into the connecting sleeve and passes through the clamping plate through hole. The clamping main plate can be clamped in the clamping groove.

20 Claims, 10 Drawing Sheets

HANDLE CONNECTING STRUCTURE

CROSS-REFERENCE TO RELATED PATENT APPLICATIONS

This application claims the benefit of priority to Chinese Utility Model Patent application No. 202321171151.4, filed May 16, 2023, the entirety of which is incorporated herein by reference.

BACKGROUND

In sanitary products, a handle is a commonly used part, which are used to control the switch of the faucet. In the prior art, the handle is fixed with the base by screw and requires a screwdriver tool to complete the installation. In an area with narrow space, it is difficult for a screwdriver to reach in, and it is inconvenient to disassemble and replace. Alternatively, the screw is prone to rust and corrosion in a humid environment, making it difficult to disassemble, replace and repair. In view of this, it is necessary to provide a handle connecting structure that does not require a screw connection and is convenient for quick disassembly and installation.

SUMMARY

The present application relates to the field of sanitary products, and particularly to a handle connecting structure. The application aims to overcome the defects in the prior art and provide a handle connecting structure that does not require a screw connection and is convenient for quick disassembly and installation.

A technical solution of the application provides a handle connecting structure, comprising a handle body having a connecting shaft sleeve, a connecting base having a connecting sleeve, and a sliding clamping plate assembled in the connecting sleeve and capable of sliding along a radial direction of the connecting sleeve. The connecting shaft sleeve is pluggably inserted into the connecting sleeve, and a clamping groove is provided on the circumferential surface of the connecting sleeve. The sliding clamping plate comprises a clamping main plate with a clamping plate through hole and a guiding protrusion and an elastic member connected to opposite sides of the clamping main plate.

In some embodiments, the connecting sleeve has a guiding hole for the guiding protrusion to pass through. The guiding protrusion is in clearance fit with the guiding hole. The elastic member is in contact with the connecting sleeve. The connecting shaft sleeve is inserted into the connecting sleeve and passes through the clamping plate through hole. The clamping main plate is clamped within the clamping groove.

In one of the optional technical solutions, one end of the clamping main plate connected with the elastic member has a connecting bump, and one of the elastic members is connected to each of the opposite sides of the connecting bump.

In one of the optional technical solutions, the connecting shaft sleeve has a tapered protrusion on the circumference surface of the connecting shaft sleeve capable of passing through the clamping plate through hole and pushing the sliding clamping plate towards the side of the elastic member. In the direction along which the connecting shaft sleeve is inserted into the connecting sleeve, the tapered protrusion is located on the front side of the clamping groove and a radius of the tapered protrusion gradually becomes smaller.

In one of the optional technical solutions, a sleeve top cover is connected to one end of the connecting sleeve facing the handle body, the sleeve top cover has a top cover through hole, the connecting sleeve passes through the top cover through hole. The clamping main plate is slidingly connected with the sleeve top cover.

In one of the optional technical solutions, one end of the guiding protrusion away from the sliding clamping plate has a stopper, and the stopper is connected with the guiding protrusion in an L-shape.

In one of the optional technical solutions, the handle body also has a body sleeve coaxially arranged with the connecting sleeve, the connecting sleeve is located in the body sleeve. The connecting sleeve is assembled in the body sleeve, the body sleeve has a holding member through hole for the holding member to pass through, the holding member through hole is aligned with the guiding hole.

In one of the optional technical solutions, an abrasion-resistant gasket is mounted between the connecting sleeve and the body sleeve. In one of the optional technical solutions, the connecting sleeve is connected with a retaining ring at an end away from the handle body, an end face of the body sleeve has a limiting groove, and the retaining ring is assembled in the limiting groove. In one of the optional technical solutions, the limiting groove is assembled with an elastic gasket. In one of the optional technical solutions, the connecting shaft sleeve has a first internal thread in the center hole. An adapter sleeve having a second internal thread is connected into the connecting sleeve, and one end of the connecting shaft sleeve is inserted into the adapter sleeve.

By adopting the technical solutions above, the application has the following beneficial effects. According to the handle connecting structure provided by the application, the connecting shaft sleeve of the handle body is provided with the clamping groove, the sliding clamping plate is capable of sliding radially in the connecting sleeve of the connecting base, the guiding protrusion of the sliding clamping plate is gap-fitted in the guiding hole of the connecting sleeve, and the elastic member of the sliding clamping plate is contact with an inner surface of the connecting sleeve, driving the sliding clamping plate toward the side of the guiding protrusion. When assembling, the connecting sleeve is inserted into the connecting sleeve and passes through the clamping plate through hole of the sliding clamping plate. When the clamping groove moves to the hole wall of the clamping plate through hole, under the action of the elastic member, the hole wall of the clamping plate through hole close to the side of the elastic member is clamped within the clamping groove, and the assembly of the handle body and the connecting base is completed. When it needs to disassemble, the holding member is used to push against the guiding protrusion and overcome the force of the elastic member, driving the sliding clamping plate to move toward the side of the elastic member. The hole wall of the clamping plate through hole leaves the clamping groove, and then the connecting shaft sleeve can be pulled out, and the handle body can be disassembled from the connecting base.

Hereby, according to the handle connecting structure provided by the application, the handle body and the connecting base do not need to be connected by screws, and the assembly of the handle body and the connecting base can be quickly done, and it is also convenient to disassemble the handle body from the connecting base for maintenance and replacement. The operation is easy, simple and practical.

The present application discloses a handle connecting structure, comprising a handle body having a connecting shaft sleeve, a connecting base having a connecting sleeve, and a sliding clamping plate assembled in the connecting sleeve and capable of sliding along a radial direction of the connecting sleeve; the connecting shaft sleeve is pluggably inserted into the connecting sleeve, and a clamping groove is provided on the circumferential surface of the connecting sleeve; the sliding clamping plate comprises a clamping main plate with a clamping plate through hole, a guiding protrusion and a elastic member connected to opposite sides of the clamping main plate; the connecting sleeve has a guiding hole for the guiding protrusion to pass through, the guiding protrusion is in clearance fit with the guiding hole, and the elastic member is in contact with the connecting sleeve; the connecting shaft sleeve is inserted into the connecting sleeve and passes through the clamping plate through hole, and the clamping main plate is clamped in the clamping groove. The handle connecting structure disclosed by the application allows the handle body and the connecting base to be connected without the need of screws. The assembly of the handle body and the connecting base can be quickly done. It is also convenient to disassemble the handle body from the connecting base for maintenance and replacement. The operation is easy, simple and practical.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The specific embodiments of the application will be further described with reference to the drawings hereinafter. Same parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

As shown in FIGS. 1 to 11, a handle connecting structure provided by an embodiment of the application, comprises a handle body 1 having a connecting shaft sleeve 11, a connecting base 2 having a connecting sleeve 21, and a sliding clamping plate 3 assembled in the connecting sleeve 21 and capable of sliding along a radial direction of the connecting sleeve 21.

In some embodiments, the connecting shaft sleeve 11 is pluggably inserted into the connecting sleeve 21, and a clamping groove 111 is provided on the circumferential surface of the connecting shaft sleeve 11.

In some embodiments, the sliding clamping plate 3 comprises a clamping main plate 31 with a clamping plate through hole 32 and a guiding protrusion 33 and an elastic member 36 connected to opposite sides of the clamping main plate 31.

In some embodiments, the connecting sleeve 21 has a guiding hole 211 for the guiding protrusion 33 to pass through, the guiding protrusion 33 is in clearance fit with the guiding hole 211, and the elastic member 36 is in contact with the connecting sleeve 21.

In some embodiments, the connecting shaft sleeve 11 is inserted into the connecting sleeve 21 and passes through the clamping plate through hole 32, and the clamping main plate 31 is clamped within the clamping groove 111.

The application provides a handle connecting structure for assembling a handle body 1 with a connecting base 2. The handle connecting structure comprises a handle body 1, a connecting base 2, a sliding clamping plate 3 and the like.

One end of the handle body 1 facing the connecting base 2 is provided with a connecting shaft sleeve 11, and the connecting shaft sleeve 11 can be used to be connected with a valve core of a faucet. A circle of clamping groove 111 is provided on the circumferential surface of the connecting shaft sleeve 11, which are used to clamp the sliding clamping plate 3 to assemble the handle body 1 with the connecting base 2.

The connecting base 2 comprises a connecting sleeve 21, the connecting shaft sleeve 11 is coaxially arranged with the connecting shaft sleeve 21. The connecting shaft sleeve 11 is capable of pluggably inserting into the connecting sleeve 21, and of withdrawing from the connecting shaft sleeve 21. One side of the connecting shaft sleeve 21 has a guiding hole 211, which is used for a guiding protrusion 33 at one end of the sliding clamping plate 3 to pass through.

The sliding clamping plate 3 may use a plastic plate, a stainless steel plate, or the like. The sliding clamp plate 3 comprises a clamping main plate 31, a clamping plate through hole 32, a guiding protrusion 33 and an elastic member 36. The clamping plate through hole 32 is provided on the clamping main plate 31, and the clamping plate through hole 32 is substantially a waist-shaped hole. The clamping main plate 31 is in the connecting sleeve 21 and is perpendicular to the axial direction of the connecting sleeve 21, and the sliding clamping plate 3 is slidingly assembled with the connecting sleeve 21, and the sliding clamping plate 3 is capable of sliding along a radial direction in the connecting sleeve 21. As needed, a guiding rail or a guiding groove may be configured in the connecting sleeve 21, and the sliding clamping plate 3 is slidably assembled with the guiding rail or the guiding groove.

The size of the clamping plate through hole 32 is larger than the diameter of the connecting shaft sleeve 11, and the connecting shaft sleeve 11 is capable of passing through the clamping plate through hole 32, and the clamping plate through hole 32 is movable relative to the connecting shaft sleeve 11 in a radial direction relative to the connecting sleeve 21. As needed, the end of the connecting shaft sleeve 11 may be set as a tip portion for guiding the insertion into the clamping plate through hole 32.

The guiding protrusion 33 is connected to one end of the clamping main plate 31 facing the guiding hole 211, and the guiding protrusion 33 is in clearance fit with the guiding hole 211, and the guiding protrusion 33 may slides relative to the guiding hole 211. An end of the guiding protrusion 33 may extend out from the guiding hole 211, so that a holding member (e.g., a supporting pin, or a supporting pillar) to press against the guiding protrusion 33, thereby causing the sliding clamping plate 3 to move. An elastic member 36 is connected to one end of the clamping main plate 31 opposite the guiding protrusion 33, and the elastic member 36 is in contact with the connecting sleeve 21. In the initial state, the sliding clamping plate 3 moves towards a side of the guiding hole 211 under an action of the elastic member 36. When the holding member is pressed against the guiding protrusion 33, the elastic member 36 is compressed and the sliding clamping plate 3 moves towards a side of the elastic member 36. The elastic member 36 may use a resilient sheet, a spring, or the like.

When the handle main body 1 is in a connecting state with the connecting base 2, the connecting shaft sleeve 11 is inserted into the connecting sleeve 21 and the connecting shaft sleeve 11 also passes through the clamping plate through hole 32, and the clamping main plate 31 is clamped within the clamping groove 111. The clamping fit of the clamping main plate 31 and the clamping groove 111 means that the hole wall of the clamping plate through hole 32 close to the elastic member 36 is clamped into the clamping groove 111.

When assembled, the connecting shaft sleeve 11 is inserted into the connecting sleeve 21 and passes through the clamping plate through hole 32 of the sliding clamping plate 3. At this time, under the action of the elastic member 36, the hole wall of the clamping plate through hole 32 close to the elastic member 36 is kept in contact with the connecting shaft sleeve 11. There is a large space between the hole wall of the clamping plate through hole 32 close to the guiding protrusion 33 and the connecting shaft sleeve 11, and when the clamping groove 111 is moved to the hole wall of the clamping plate through hole 32, under the action of the elastic member 36, the hole wall of the clamping plate through hole 32 close to the elastic member 36 is clamped within the clamping groove 111, and the assembly of the handle body 1 and the connecting base 2 is completed.

When it needs to disassemble, use the holding member to push against the guiding protrusion 33 and overcome the force of the elastic member 36, driving the sliding clamping plate 3 to move toward the elastic member 36.

The hole wall of the clamping plate through hole 32 leaves the clamping groove 111, and then the connecting shaft sleeve 11 can be pulled out, and the handle body 1 can be disassembled from the connecting base 2.

Hereby, according to the handle connection structure provided by the application, the handle body 1 and the connecting base 2 do not need to be connected by screws, and the assembly of the handle body 1 and the connecting base 2 can be quickly done, and it is also convenient to remove the handle body 1 from the connecting base 2 for maintenance and replacement, which is easy to operate and simple and useful.

Figure 5:
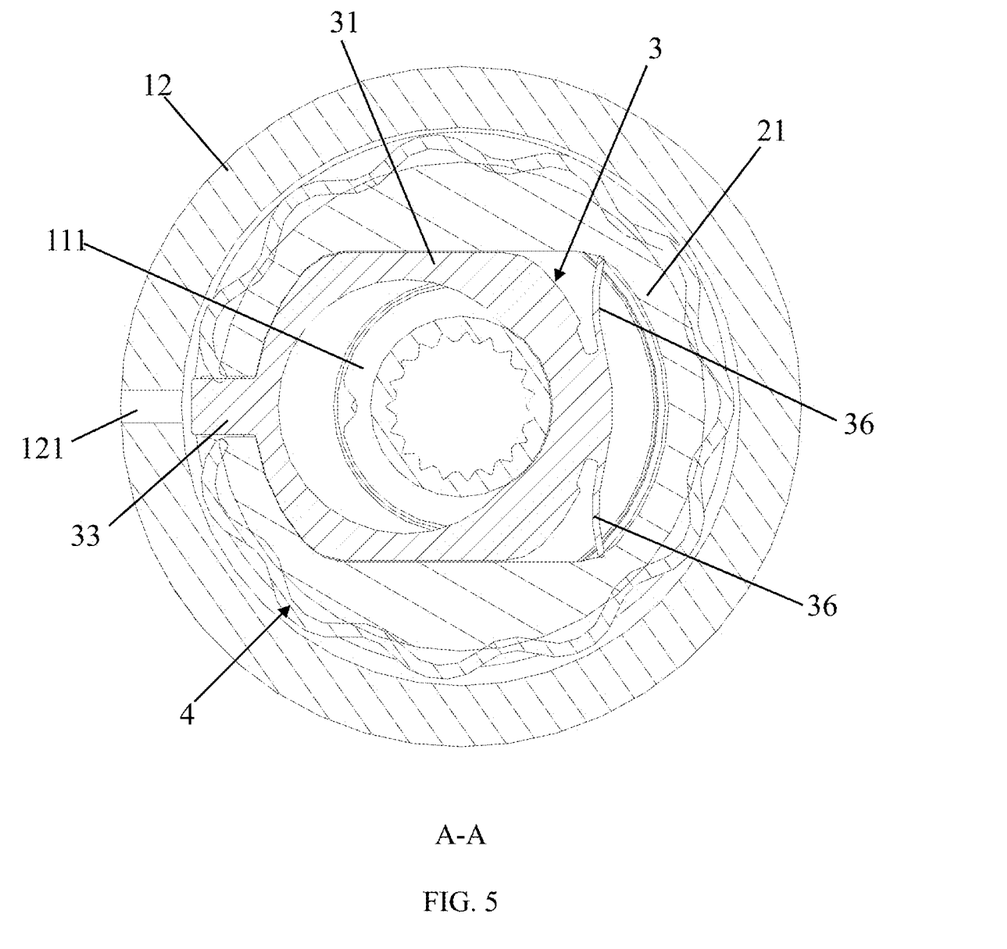
FIG. 5 is a sectional view shown in FIG. 4 along the A-A direction, according to an exemplary embodiment.
Figure 6:
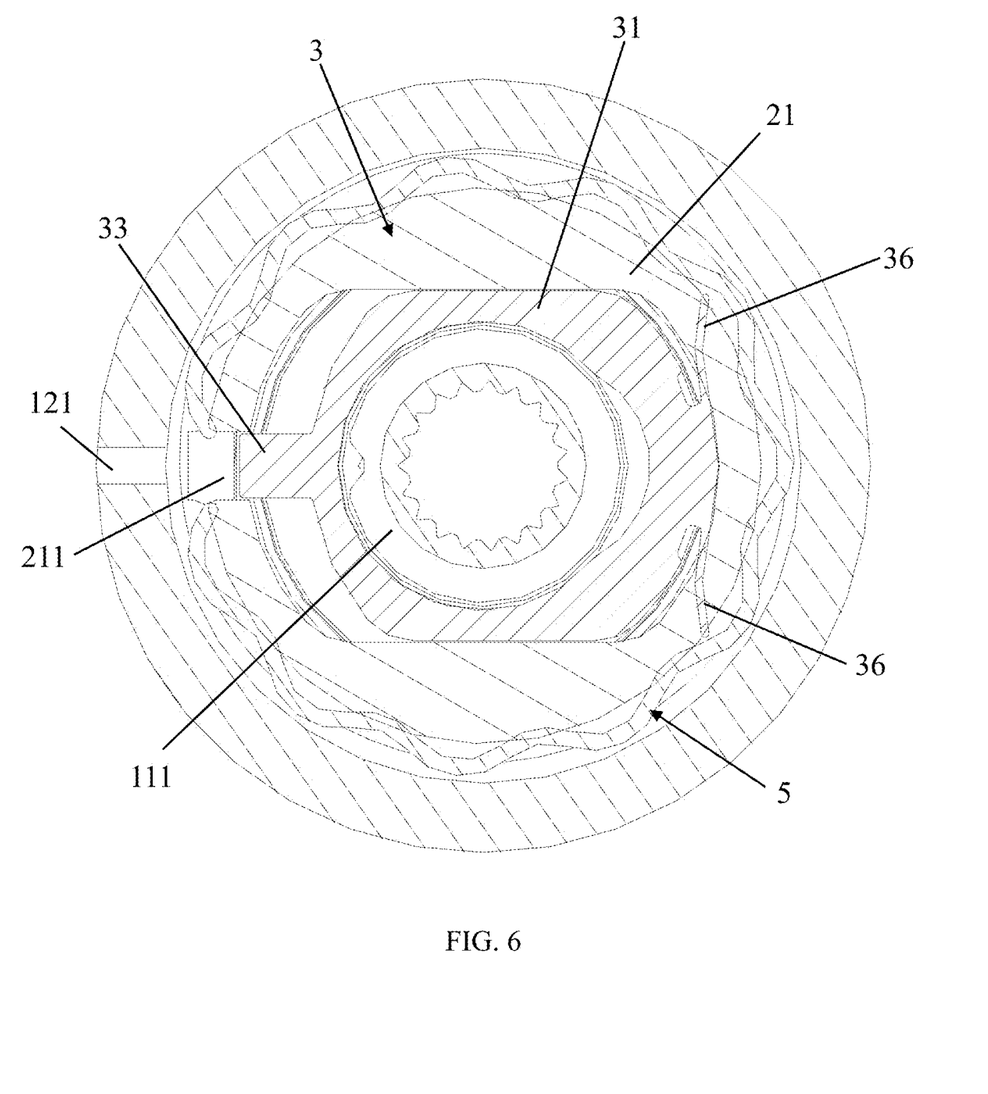
FIG. 6 is a schematic diagram of a sliding clamping plate when it is separated from a clamping groove, according to an exemplary embodiment.
Figure 7:
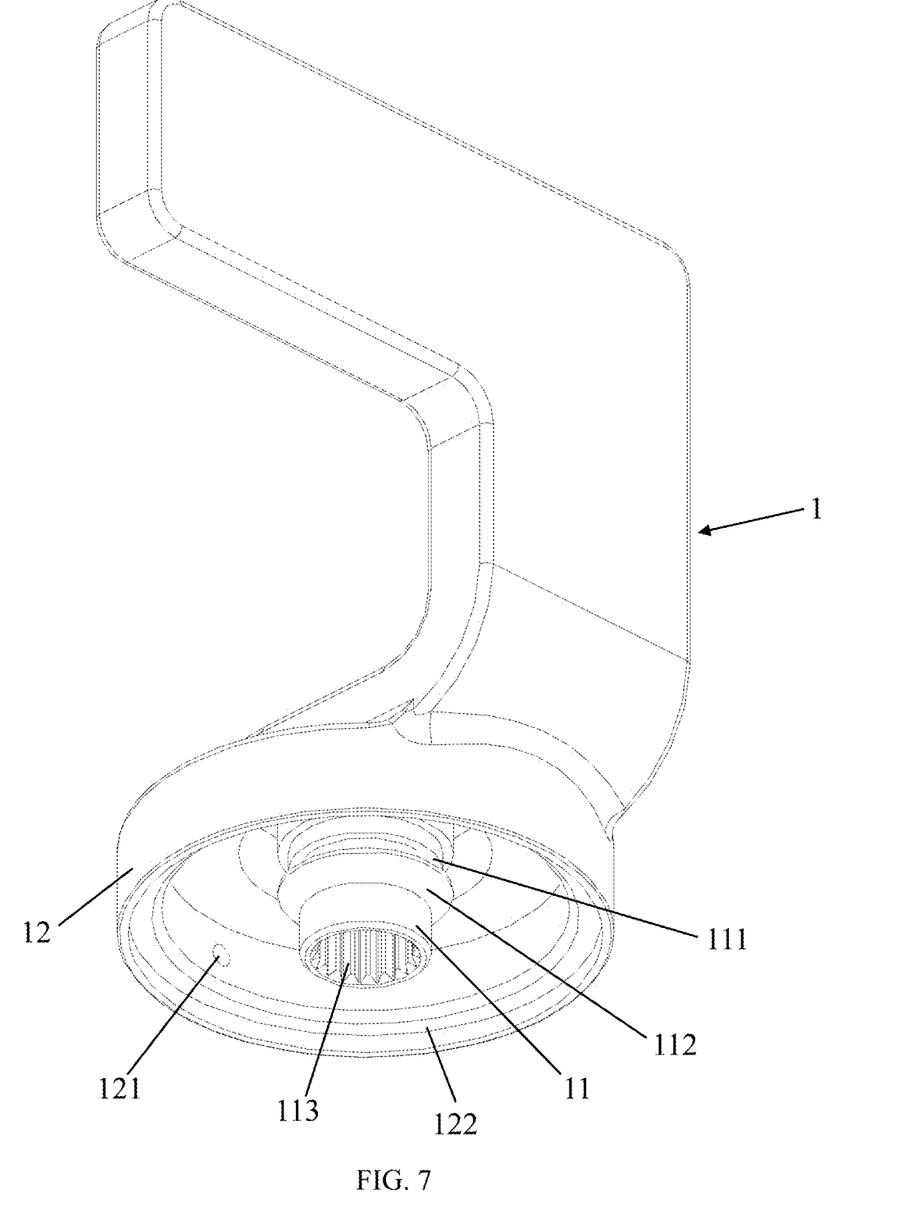
FIG. 7 is a perspective view of a handle body, according to an exemplary embodiment.
Figure 8:
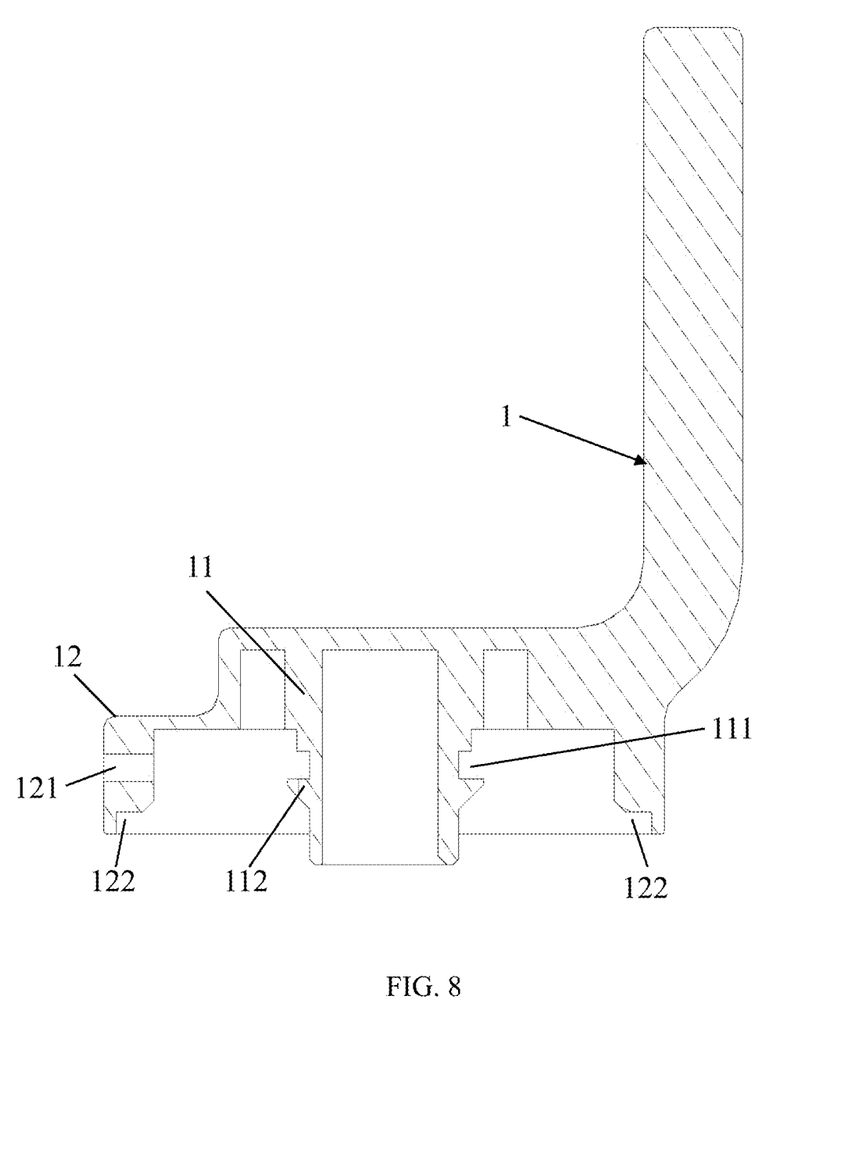
FIG. 8 is a sectional view of the handle body, according to an exemplary embodiment.
Figure 11:
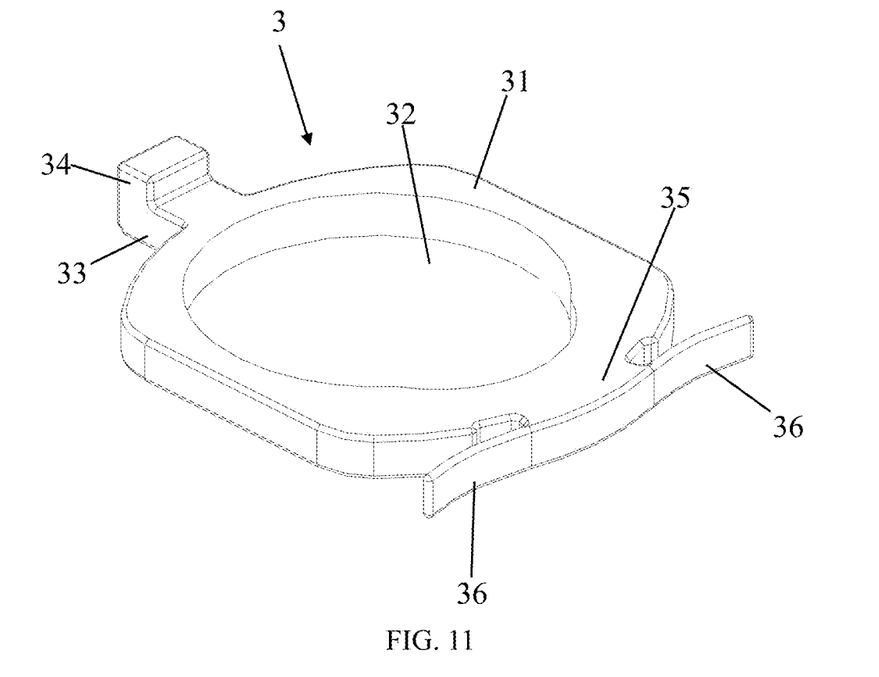
FIG. 11 is a perspective view of the slide clamping plate, according to an exemplary embodiment.

In one of the embodiments, as shown in FIGS. 5 to 6 and FIG. 11, one end of the clamping main plate 31 connected with the elastic member 36 has a connecting bump 35, and one of the elastic members 36 is connected to each of the opposite sides of the connecting bump 35, and the two elastic members 36 are arranged symmetrically with one diameter of the connecting sleeve 21, which is beneficial for driving the sliding clamping plate 3 to move stably as a whole.

In one of the embodiments, as shown in FIGS. 4 to 8, the connecting shaft sleeve 11 has a tapered protrusion 112 on the circumference surface of the connecting shaft sleeve 11, the tapered protrusion 112 is capable of passing through the clamping plate through hole 32 and pushing the sliding clamping plate 3 towards the elastic member 36.

In the direction along which the connecting shaft sleeve 11 is inserted into the connecting sleeve 21, the tapered protrusion 112 is located on the front side of the clamping groove 111 and a radius of the tapered protrusion 112 gradually becomes smaller.

In this embodiment, the connecting shaft sleeve 11 is also configured with the tapered protrusion 112, which is used to cooperate with the hole wall of the clamping plate through hole 32 before it is clamped within the clamping groove 111, so as to push the sliding clamping plate 3 toward the elastic member 36, to facilitate smooth movement of the portion of the connecting shaft sleeve 11 having the clamping groove 111 to the hole wall of the clamping plate through hole 32.

Specifically, in the direction along which the connecting shaft sleeve 11 is inserted into the connecting sleeve 21, the tapered protrusion 112 is located on the front side of the clamping groove 111, which is, the tapered protrusion 112 passes through the clamping plate through hole 32 first, and the clamping groove 111 enters into the clamping plate through hole 32 later. In the direction along which the connecting shaft sleeve 11 is inserted into the connecting sleeve 21, a radius of the tapered protrusion 112 gradually becomes smaller. The rear end face of the tapered protrusion 112 having the maximum radius is the front groove wall of the clamping groove 111, and the maximum radius of the tapered protrusion 112 is larger than the groove depth of the clamping groove 111.

When the connecting shaft sleeve 11 is passed through the clamping plate through hole 32, the tapered protrusion 112 enters the clamping plate through hole 32 first, and the beveled surface of the tapered protrusion 112 pushes against the hole wall of the clamping plate through hole 32, causing the sliding clamping plate 3 to move toward the elastic member 36. After the hole wall of the clamping plate through hole 32 crosses the tapered protrusion 112, the clamping groove 111 reaches the clamping plate through hole 32 smoothly, and under the action of the elastic member 36, the sliding clamping plate 3 moves rapidly towards the guiding protrusion 33, so that the hole wall of the clamping plate through hole 32 close to the elastic member 36 is clamped within the clamping groove 111, in order to assemble the handle body 1 with the connecting base 2 together.

During disassembly, the hole wall of the clamping plate through hole 32 close to the elastic member 36 leaves the clamping groove 111 by the holding member pushing against the guiding protrusion 33, and the distance pushed by the guiding protrusion 33 is greater than the maximum radius of the tapered protrusion 112, and the tapered protrusion 112 can pass through the clamping plate through hole 32 to complete the disassembly of the handle body 1 from the connecting base 2.

Figure 4:
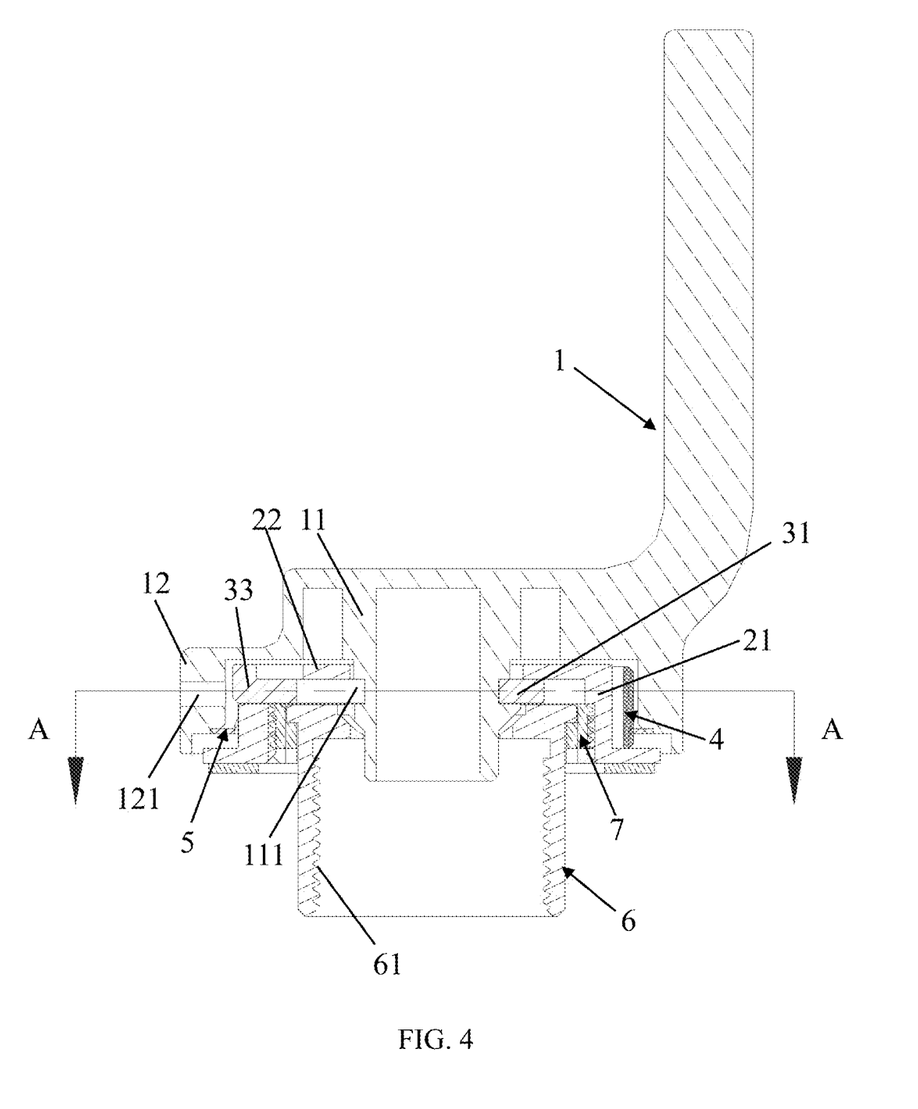
FIG. 4 is a sectional view of the handle connecting structure, according to an exemplary embodiment.
Figure 9:
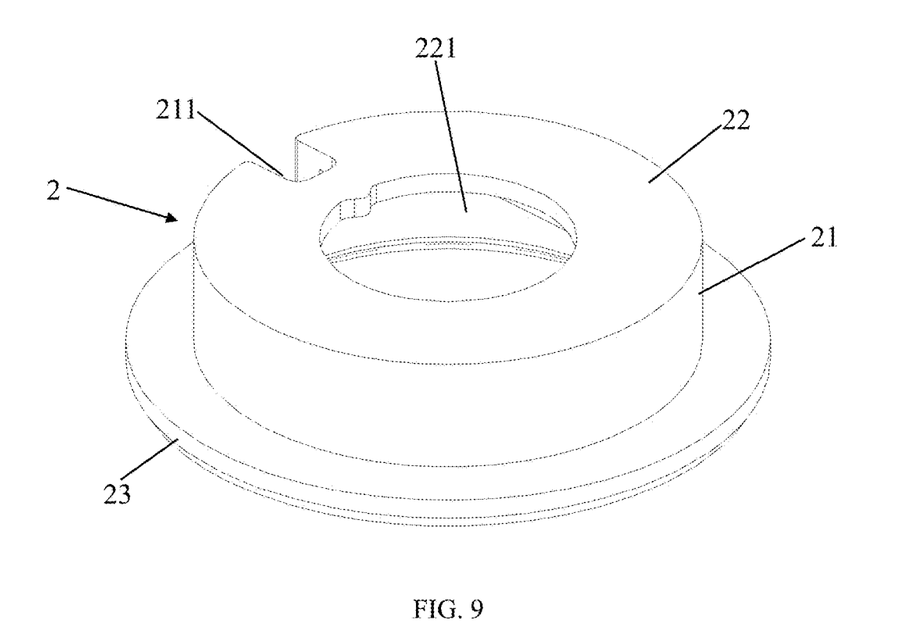
FIG. 9 is a perspective view of a connecting base, according to an exemplary embodiment.
Figure 10:
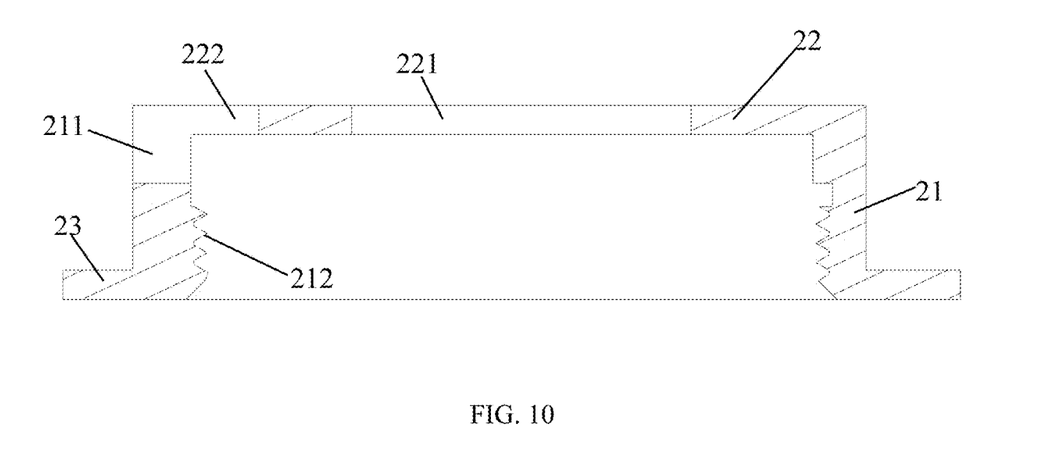
FIG. 10 is a sectional view of the connecting base, according to an exemplary embodiment.

In one of the embodiments, as shown in FIG. 4 and FIGS. 9 to 10, a sleeve top cover 22 is connected to one end of the connecting sleeve 21 facing the handle body 1, the sleeve top cover 22 has a top cover through hole 221 on it, the connecting shaft sleeve 11 passes through the top cover through hole 221. The clamping main plate 31 is slidingly connected with the sleeve top cover 22.

In this embodiment, the sleeve top cover 22 is provided at one end of the connecting sleeve 21, the sleeve top cover 22 facing the handle body 1. The sleeve top cover 22 has a top cover through hole 221, the connecting shaft sleeve 11 passes through the top cover through hole 221. The clamping main plate 31 may be slidingly contacted or slidingly connected with the sleeve top cover 22, which is beneficial for enhancing the mobile stability of the clamping main plate 31.

In one of the embodiments, as shown in FIG. 11, a stopper 34 is provided on the end of the guiding protrusion 33 away from the sliding clamping plate 3, and the stopper 34 is connected with the guiding protrusion 33 in an L-shape.

In this embodiment, the stopper 34 is connected to the end of the guiding protrusion 33, the stopper 34 extends towards the handle body 1, and the stopper 34 is integrally connected with the guiding protrusion 33 in an L-shape. The stopper 34 can limit the maximum distance that the guiding protrusion 33 can be pushed by the holding member. The guiding protrusion 33 is pushed to a limit position when the stopper 34 contacts the hole wall of the guiding hole 211. As needed, a groove 222 may be provided on the sleeve top cover 22, which is in communication with the guiding hole 211. As the guiding protrusion 33 is pushed to the limit position, the stopper 34 is moved to the groove bottom of the groove 222. On the other hand, by arranging the stopper 34 at the end of the guiding protrusion 33, the holding member can also push the stopper 34 to move the sliding clamping plate 3, thereby increasing the area that the holding member can be pushed against.

In one of the embodiments, as shown in FIGS. 1 to 8, the handle body 1 also has a body sleeve 12 coaxially arranged with the connecting shaft sleeve 11, the connecting shaft sleeve 11 is located in the body sleeve 12.

The connecting sleeve 21 is assembled in the body sleeve 12, the body sleeve 12 has a holding member through hole 121 for the holding member to pass through, the holding member through hole 121 is aligned with the guiding hole 211.

In this embodiment, the end of the handle body 1 facing the connecting base 2 has a body sleeve 12, and the connecting shaft sleeve 11 is located in the body sleeve 12, both are coaxially arranged. Part or all of the connecting sleeve 21 is assembled in the body sleeve 12. One side of the body sleeve 12 has a holding member through hole 121 which is used for the holding member to pass through. The holding member through hole 121 is aligned with the guiding hole 211, and the holding member can push against the guiding protrusion 33 and/or stopper 34 after passing through the holding member through hole 121. The body sleeve 12 acts as an obscured role, and the user cannot see the guiding protrusion 33 and the like from the outside.

In one of the embodiments, as shown in FIGS. 3 to 6, an abrasion-resistant gasket 4 is mounted between the connecting sleeve 21 and the body sleeve 12. The abrasion-resistant gasket 4 may use a metal gasket or a plastic gasket having a plurality of concave and convex portions, and the two ends of the abrasion-resistant gasket 4 are disconnected to form openings so as to adaptively deform. The abrasion-resistant gasket 4 is assembled between the connecting sleeve 21 and the body sleeve 12, and acts as a radial limiter, which can prevent the connecting sleeve 21 and the body sleeve 12 from colliding and rubbing to produce abnormal noise.

In one of the embodiments, as shown in FIGS. 7 to 10, the connecting sleeve 21 is connected with a retaining ring 23 at an end away from the handle body 1, an end face of the body sleeve 12 has a limiting groove 122, and the retaining ring 23 is assembled in the limiting groove 122.

In this embodiment, a retaining ring 23 is arranged around the outer surface of one end of the connecting sleeve 21, and the retaining ring 23 and the sleeve top cover 22 are located at opposite ends of the connecting sleeve 21. The end face of the body sleeve 12 facing the retaining ring 23 has a limiting groove 122, and when assembled, the retaining ring 23 is assembled in the limiting groove 122, enhancing the assembly stability of the connecting base 2 and the handle body 1.

Figure 1:
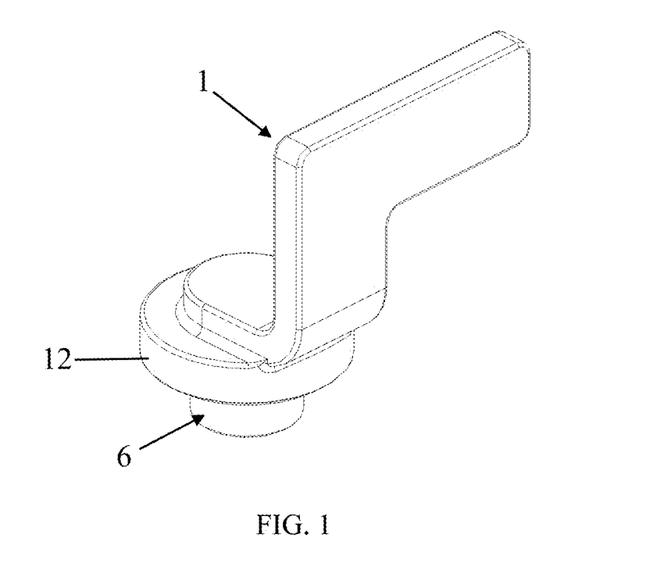
FIG. 1 is a perspective view of a handle connecting structure, according to an exemplary embodiment.
Figure 2:
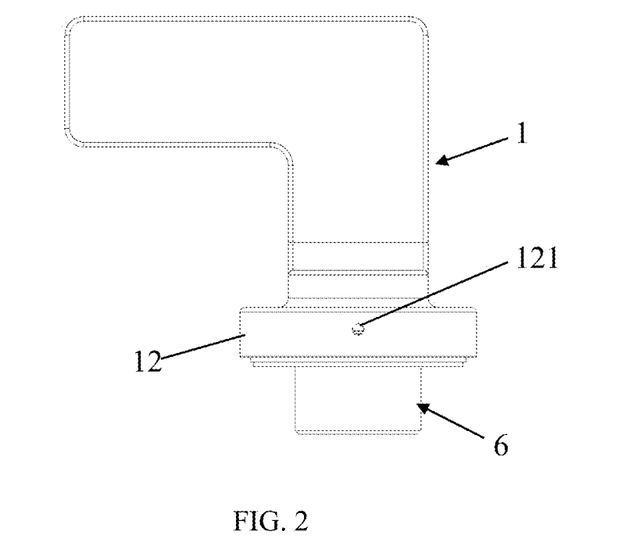
FIG. 2 is a front view of the handle connecting structure, according to an exemplary embodiment.
Figure 3:
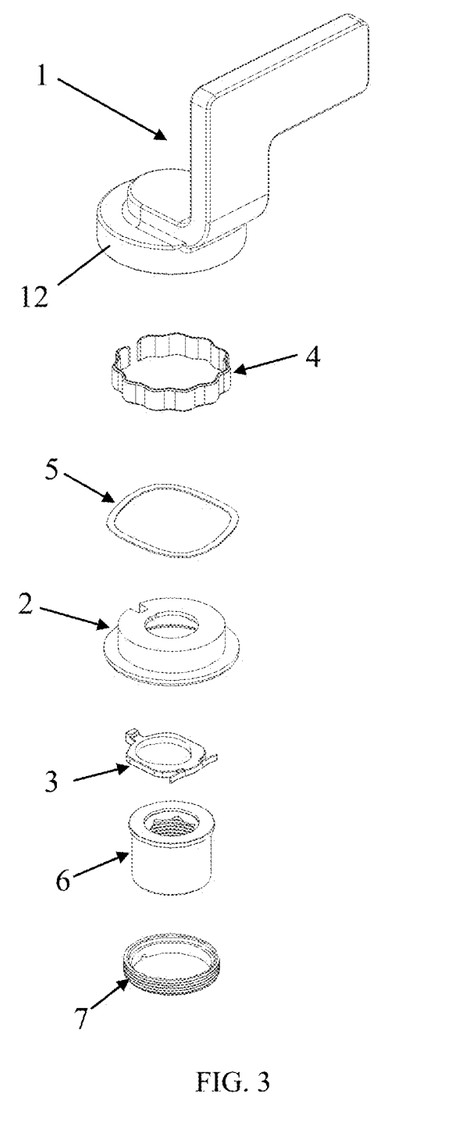
FIG. 3 is an exploded view of the handle connecting structure, according to an exemplary embodiment.

In one of the embodiments, as shown in FIGS. 3 to 4, the limiting groove 122 is assembled with an elastic gasket 5. The elastic gasket 5 may use a rubber gasket, which is assembled in the limiting groove 122, and the retaining ring 23 is pressed against the elastic gasket 5, which improves the axial stability of the connecting base 2 and the handle body 1, and also avoids abnormal noise caused by the collision and friction between the retaining ring 23 and the groove wall of the limiting groove 122.

In one of the embodiments, as shown in FIGS. 3 to 4, FIG. 7, FIG. 10 and FIGS. 12 to 13, the connecting shaft sleeve 11 has a first internal thread 113 in the center hole.

A transfer connecting sleeve 6 having a second internal thread 61 is connected in the connecting sleeve 21, and one end of the connecting shaft sleeve 11 is inserted into the transfer connecting sleeve 6.

In this embodiment, the connecting shaft sleeve 11 has a first internal thread 113 in the center hole, which can be threaded-connected with a stem of the faucet valve core.

The connecting sleeve 21 has a transfer connecting sleeve 6 connected to it, and in the transfer connecting sleeve 6, there is a second internal thread 61 that can be threaded-connected to a casing or sleeve of the faucet.

One end of the transfer connecting sleeve 6 is connected in the connecting sleeve 21 and the other end of the transfer connecting sleeve 6 may extend out from the connecting sleeve 21, and one end of the connecting shaft sleeve 11 having a first internal thread 113 is inserted into the transfer connecting sleeve 6.

Figure 12:
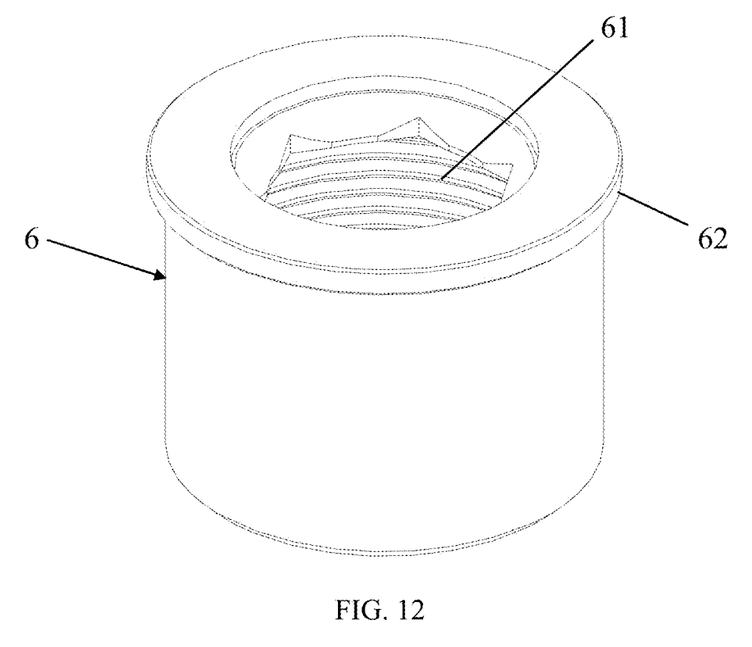
FIG. 12 is a perspective view of an adapter sleeve, according to an exemplary embodiment.
Figure 13:
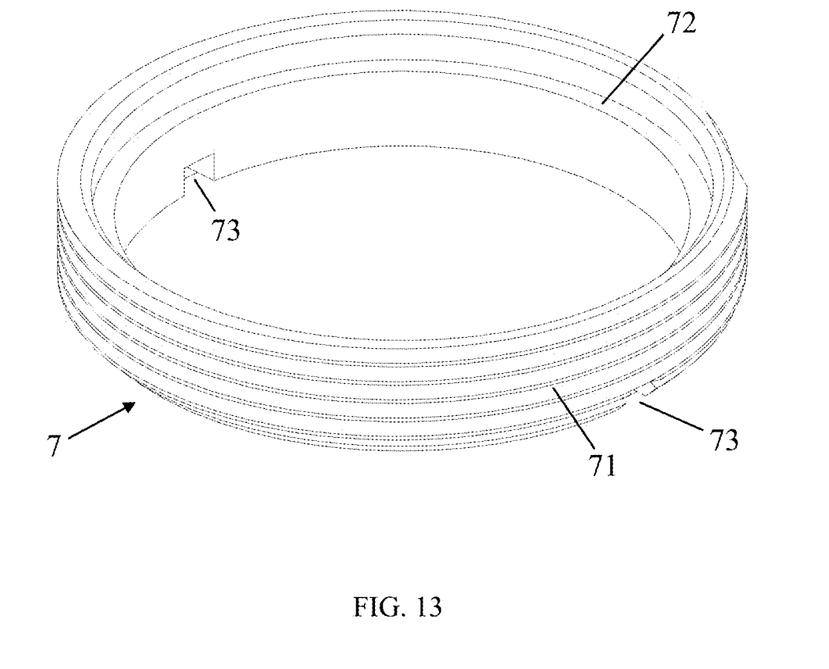
FIG. 13 is a perspective view of a connecting nut, according to an exemplary embodiment.

In one of the embodiments, as shown in FIG. 10 and FIGS. 12 to 13, the transfer connecting sleeve 6 and the connecting sleeve 21 may be connected via a nut 7. The nut 7 has external thread 71 and the connecting sleeve 21 has a third internal thread 212 on the inner surface of the connecting sleeve 21. The nut 7 has a step portion 71 on the inner surface of the nut 7, and the transfer connecting sleeve 6 has a bulge ring 62 on the end of the transfer connecting sleeve 6. The nut 7 is slipped over the transfer connecting sleeve 6, with the bulge ring 62 lapping on the step portion 71, and the third internal thread 212 engaging the external thread 71. The bottom of the nut 7 has a notch 73 for a wrench to unscrew the nut 7.

The above technical solutions may be combined as required to achieve the best technical effect.

The above are merely the principle and the preferred embodiments of the application. It should be pointed out that, for those of ordinary skills in the art, several other modifications may be made on the basis of the principle of the application, which should also be regarded as falling in the protection scope of the application.

As utilized herein with respect to numerical ranges, the terms "approximately," "relative to," "substantially," and similar terms generally mean +/−10% of the disclosed values, unless specified otherwise. As utilized herein with respect to structural features (e.g., to describe shape, size, orientation, direction, relative position, etc.), the terms "approximately," "relative to," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure. In addition, the terms "first", "second" and "third" are used for descriptive purposes only and are not to be construed as indicating or implying relative importance.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A handle connecting structure, comprising:
a handle body having a connecting shaft sleeve;
a connecting base having a connecting sleeve having a clamping groove is provided on a circumferential surface of the connecting sleeve, the connecting shaft sleeve is pluggably inserted into the connecting sleeve; and
a sliding clamping plate assembled in the connecting sleeve and capable of sliding along a radial direction of the connecting sleeve, the sliding clamping plate comprises a clamping main plate with a clamping plate through hole, a guiding protrusion, and an elastic member connected to opposite sides of the clamping main plate;
wherein the connecting sleeve has a guiding hole for the guiding protrusion to pass through, the guiding protrusion is in clearance fit with the guiding hole, and the elastic member is in contact with the connecting sleeve; and
further wherein the connecting shaft sleeve is inserted into the connecting sleeve and passes through the clamping plate through hole, and the clamping main plate is clamped in the clamping groove.

2. The handle connecting structure according to claim 1, wherein one end of the clamping main plate connected with the elastic member has a connecting bump, and the elastic member is connected to the opposite sides of the connecting bump.

3. The handle connecting structure according to claim 1, wherein the connecting shaft sleeve has a tapered protrusion on the circumferential surface of the connecting shaft sleeve capable of passing through the clamping plate through hole and pushing the sliding clamping plate towards the elastic member; and
wherein, in a direction along which the connecting shaft sleeve is inserted into the connecting sleeve, the tapered protrusion is located on a front side of the clamping groove and a radius of the tapered protrusion gradually becomes smaller.

4. The handle connecting structure according to claim 1, wherein a sleeve top cover is connected to an end of the connecting sleeve facing the handle body, the sleeve top cover has a top cover through hole, the connecting sleeve passes through the top cover through hole; and
wherein the clamping main plate is slidingly connected with the sleeve top cover.

5. The handle connecting structure according to claim 1, wherein an end of the guiding protrusion away from the sliding clamping plate has a stopper, and the stopper is connected with the guiding protrusion in an L-shape.

6. The handle connecting structure according to claim 1, wherein the handle body also has a body sleeve coaxially arranged with the connecting sleeve, the connecting sleeve is located in the body sleeve;
wherein the connecting sleeve is assembled in the body sleeve, the body sleeve has a holding member through hole for a holding member to pass through, the holding member through hole is aligned with the guiding hole.

7. The handle connecting structure according to claim 6, wherein an abrasion-resistant gasket is mounted between the connecting sleeve and the body sleeve.

8. The handle connecting structure according to claim 6, wherein the connecting sleeve is connected with a retaining ring at an end away from the handle body, an end face of the body sleeve has a limiting groove, and the retaining ring is assembled in the limiting groove.

9. The handle connecting structure according to claim 8, wherein an elastic gasket is assembled within the limiting groove.

10. The handle connecting structure according to claim 1, wherein the connecting shaft sleeve has a first internal thread in a center hole of the connecting shaft sleeve; and wherein a transfer connecting sleeve having a second internal thread is connected within the connecting sleeve, and an end of the connecting shaft sleeve is inserted into the transfer connecting sleeve.

11. A handle connecting structure, comprising:

a handle body having a connecting shaft sleeve;

a connecting base having a connecting sleeve having a clamping groove is provided on a circumferential surface of the connecting sleeve, the connecting shaft sleeve has a tapered protrusion on the circumferential surface of the connecting shaft sleeve and is pluggably insertable into the connecting sleeve; and a sliding clamping plate assembled in the connecting sleeve and capable of sliding along a radial direction of the connecting sleeve, the sliding clamping plate comprises a clamping main plate with a clamping plate through hole, a guiding protrusion, and an elastic member connected to opposite sides of the clamping main plate, wherein the connecting sleeve has a guiding hole for the guiding protrusion to pass through.

12. The handle connecting structure according to claim 11, wherein the guiding protrusion is in clearance fit with the guiding hole, and the elastic member is in contact with the connecting sleeve.

13. The handle connecting structure according to claim 12, further wherein the connecting shaft sleeve is inserted into the connecting sleeve and passes through the clamping plate through hole, and the clamping main plate is clamped in the clamping groove.

14. The handle connecting structure according to claim 13, wherein one end of the clamping main plate connected with the elastic member has a connecting bump, and the elastic members is connected to the opposite sides of the connecting bump.

15. The handle connecting structure according to claim 13, wherein the tapered protrusion on the circumferential surface of the connecting shaft sleeve is capable of passing through the clamping plate through hole and pushing the sliding clamping plate towards the elastic member.

16. The handle connecting structure according to claim 13, wherein a sleeve top cover is connected to an end of the connecting sleeve facing the handle body, the sleeve top cover has a top cover through hole, the connecting sleeve passes through the top cover through hole; and wherein the clamping main plate is slidingly connected with the sleeve top cover.

17. The handle connecting structure according to claim 13, wherein an end of the guiding protrusion away from the sliding clamping plate has a stopper, and the stopper is connected with the guiding protrusion in an L-shape.

18. The handle connecting structure according to claim 13, wherein the handle body also has a body sleeve coaxially arranged with the connecting sleeve, the connecting sleeve is located in the body sleeve; wherein the connecting sleeve is assembled in the body sleeve, the body sleeve has a holding member through hole for a holding member to pass through, the holding member through hole is aligned with the guiding hole.

19. The handle connecting structure according to claim 18, wherein the connecting sleeve is connected with a retaining ring at an end away from the handle body, an end face of the body sleeve has a limiting groove, and the retaining ring is assembled in the limiting groove.

20. The handle connecting structure according to claim 13, wherein the connecting shaft sleeve has a first internal thread in a center hole of the connecting shaft sleeve; and further wherein a transfer connecting sleeve having a second internal thread is connected within the connecting sleeve, and an end of the connecting shaft sleeve is inserted into the transfer connecting sleeve.

* * * * *